United States Patent
Loghin et al.

(10) Patent No.: US 12,515,632 B2
(45) Date of Patent: Jan. 6, 2026

(54) COMPACT BRAKING DEVICE FOR A HYDRAULIC MOTOR VEHICLE BRAKING SYSTEM

(71) Applicant: Continental Automotive Technologies GmbH, Hannover (DE)

(72) Inventors: Constantin Loghin, Iasi (RO); Cristian-Constantin Apetrei, Iasi (RO); Eduard Cretu, Iasi (RO); Constantin-Petrica Cazacu, Liteni (RO); Marius Cucos, Iasi (RO); Marius-Vasilica Adam, Iasi (RO); Ionut-Madalin Pista, Iasi (RO); Radu-Tudorel Damian, Iasi (RO); Cristian Aonesti, Piatra Neamt (RO)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 578 days.

(21) Appl. No.: 17/997,331

(22) PCT Filed: Apr. 19, 2021

(86) PCT No.: PCT/DE2021/200048
§ 371 (c)(1),
(2) Date: Oct. 27, 2022

(87) PCT Pub. No.: WO2021/219171
PCT Pub. Date: Nov. 4, 2021

(65) Prior Publication Data
US 2023/0166704 A1    Jun. 1, 2023

(30) Foreign Application Priority Data

Apr. 28, 2020    (DE) .................. 10 2020 205 358.8

(51) Int. Cl.
*B60T 13/74*    (2006.01)
*B60T 8/40*    (2006.01)
(Continued)

(52) U.S. Cl.
CPC ............ *B60T 13/686* (2013.01); *B60T 8/409* (2013.01); *B60T 13/662* (2013.01); *B60T 13/745* (2013.01); *B60T 2220/04* (2013.01)

(58) Field of Classification Search
CPC ........ B60T 13/745; B60T 8/368; B60T 8/409; B60T 2220/04
See application file for complete search history.

(56) References Cited

U.S. PATENT DOCUMENTS

| 6,026,643 A | 2/2000 | Kullmann et al. |
| 6,042,200 A * | 3/2000 | Hosoya .................. B60T 8/368 |
| | | 303/119.3 |

(Continued)

FOREIGN PATENT DOCUMENTS

| CN | 102092376 A | 6/2011 |
| CN | 102834307 A | 12/2012 |

(Continued)

OTHER PUBLICATIONS

Office action dated Dec. 12, 2023 of the counterpart CN application No. 202180018353.2.

(Continued)

*Primary Examiner* — Bradley T King

(57) ABSTRACT

A braking device for a hydraulic motor vehicle braking system has a housing with a cylinder bore formed therein along a bore axis (A), with at least one piston which is actuable axially in the cylinder bore by a pedal, and which braking device has at least one simulator unit which is positioned directly below the cylinder bore with a simulator (Continued)

axis (S) which is oriented perpendicularly to the side flank and transversely with respect to the bore axis (A).

13 Claims, 4 Drawing Sheets

(51) Int. Cl.
*B60T 13/66* (2006.01)
*B60T 13/68* (2006.01)

(56) References Cited

U.S. PATENT DOCUMENTS

| | | | |
|---|---|---|---|
| 6,634,723 B1* | 10/2003 | Ganzel | B60T 8/368 |
| | | | 303/DIG. 10 |
| 10,507,811 B2* | 12/2019 | Tandler | B60T 8/368 |
| 10,549,737 B2* | 2/2020 | Leiber | B60T 13/145 |
| 2003/0098611 A1 | 5/2003 | Drott | |
| 2005/0067885 A1 | 3/2005 | Ogiwara et al. | |
| 2008/0217122 A1 | 9/2008 | von Hayn | |
| 2011/0132703 A1 | 6/2011 | Kim et al. | |
| 2011/0265901 A1* | 11/2011 | Kodama | B60T 8/368 |
| | | | 137/899 |
| 2013/0232966 A1* | 9/2013 | Murayama | B60T 7/042 |
| | | | 60/545 |
| 2014/0216866 A1 | 8/2014 | Feigel et al. | |
| 2016/0016567 A1* | 1/2016 | Jürgens | B60T 8/368 |
| | | | 303/10 |
| 2016/0121864 A1* | 5/2016 | Misunou | B60T 11/26 |
| | | | 60/591 |
| 2019/0031164 A1 | 1/2019 | Tandler et al. | |
| 2019/0232934 A1 | 8/2019 | Weh et al. | |
| 2019/0241167 A1 | 8/2019 | Peichl et al. | |
| 2020/0108812 A1* | 4/2020 | Speer | F16K 31/06 |
| 2020/0114894 A1 | 4/2020 | Leiber | |
| 2020/0139949 A1 | 5/2020 | Dolmaya et al. | |
| 2020/0282968 A1 | 9/2020 | Mayr et al. | |
| 2020/0290581 A1* | 9/2020 | Kawakami | B60T 13/18 |
| 2020/0391712 A1* | 12/2020 | Mallmann | B60T 8/368 |
| 2021/0309197 A1* | 10/2021 | Weh | B60T 8/368 |
| 2021/0339724 A1* | 11/2021 | Maruo | B60T 13/662 |
| 2022/0105914 A1* | 4/2022 | Leiber | B60T 8/172 |
| 2022/0135014 A1* | 5/2022 | Briesewitz | B60T 13/686 |
| | | | 303/116.4 |
| 2023/0048099 A1* | 2/2023 | Weh | B60T 8/368 |
| 2023/0356700 A1* | 11/2023 | Jia | B60T 8/4081 |
| 2024/0025384 A1* | 1/2024 | Weh | B60T 17/04 |
| 2024/0157925 A1* | 5/2024 | Weh | B60T 17/00 |
| 2024/0239318 A1* | 7/2024 | Weh | B60T 13/745 |
| 2025/0115226 A1* | 4/2025 | Dumitrascu | B60T 13/745 |

FOREIGN PATENT DOCUMENTS

| | | |
|---|---|---|
| CN | 103874609 A | 6/2014 |
| CN | 104176027 A | 12/2014 |
| DE | 102016222562 A1 | 5/2018 |
| DE | 102017114556 A1 | 1/2019 |
| DE | 102017216001 A1 | 3/2019 |
| DE | 102020205359 A1 * | 10/2021 |
| EP | 3414136 B1 | 3/2020 |
| JP | 2005104334 A | 4/2005 |
| JP | 2019073284 A | 5/2019 |
| KR | 20120106206 A | 9/2012 |
| KR | 20180032382 A | 3/2018 |
| KR | 20190042703 A | 4/2019 |
| KR | 20200016343 A | 2/2020 |
| KR | 102079403 B1 | 4/2020 |
| WO | 2019052712 A1 | 3/2019 |

OTHER PUBLICATIONS

Chinese Third Office Action dated Aug. 7, 2024 for the counterpart Chinese Patent Application 202180018353.2 and machine translation of same.
Chinese Notice of Allowance dated Sep. 12, 2024 for the counterpart Chinese Patent Application 202180018353.2 and machine translation of same.
Request for the Submission of an Opinion dated Mar. 25, 2024 for the Korean Patent Application No. 10-2022-7029659 and machine translation of same.
German Search Report dated Mar. 11, 2021 for the counterpart German Patent Application No. 10 2020 205 358.8.
The International Search Report and the Written Opinion of the International Searching Authority mailed on Jul. 28, 2021 for the counterpart PCT Application No. PCT/DE2021/200048.
Notice of Reasons for Refusal drafted Oct. 4, 2023 for the counterpart Japanese Patent Application No. 2022-552385 and translation of same.
Chinese Office Action dated May 11, 2024 for the counterpart Chinese Patent Application No. 202180018353.2 and machine translation of same.

* cited by examiner

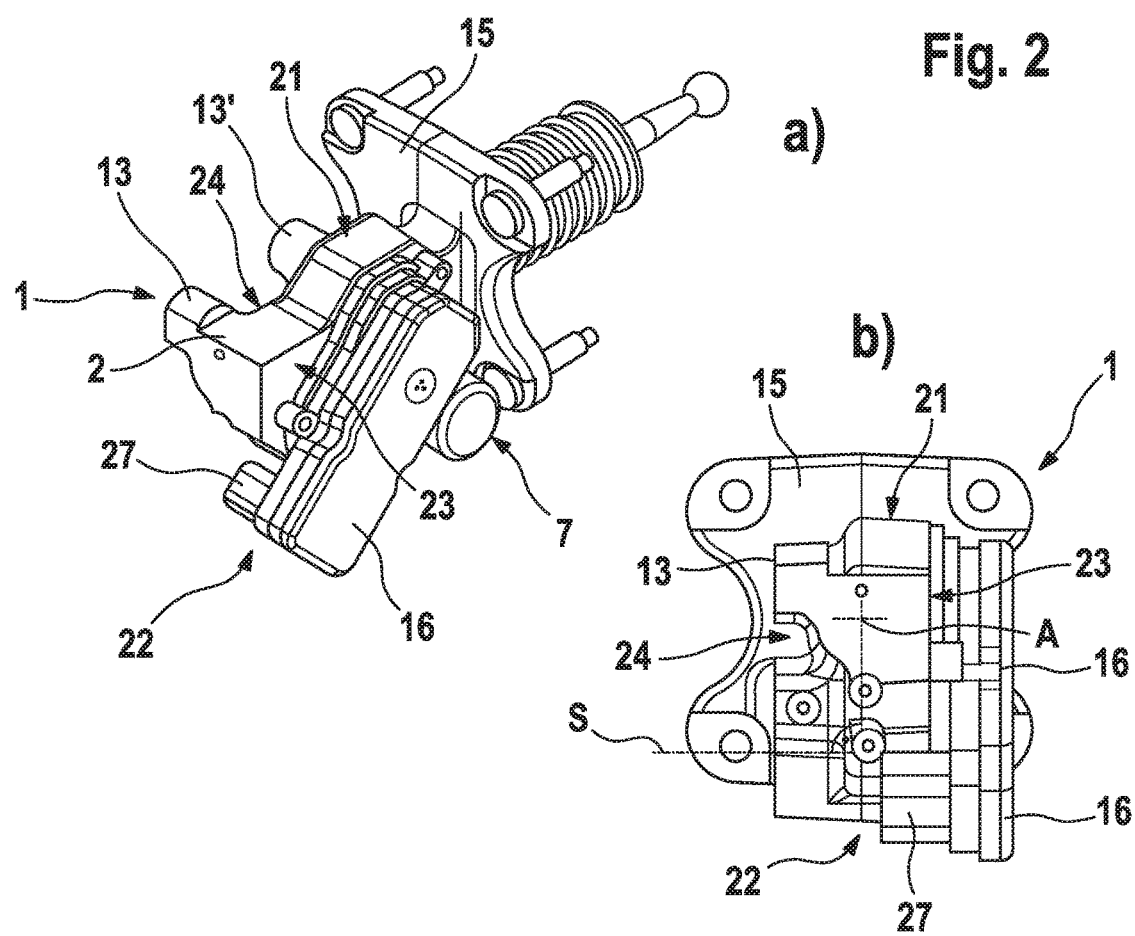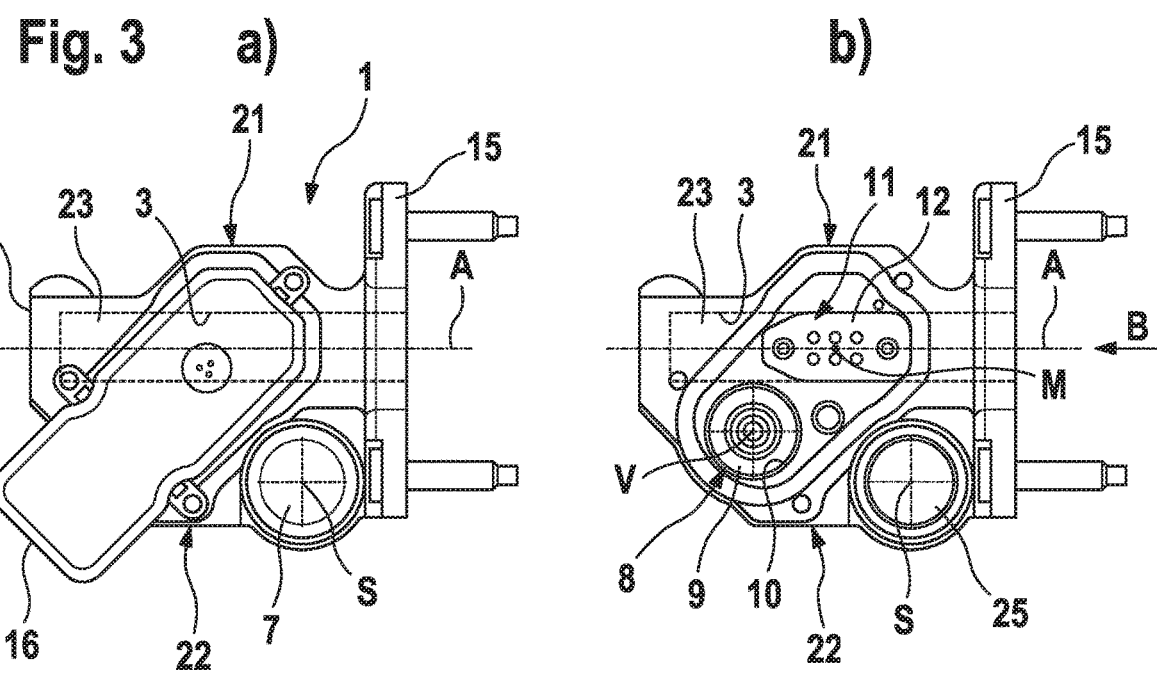

Fig. 4
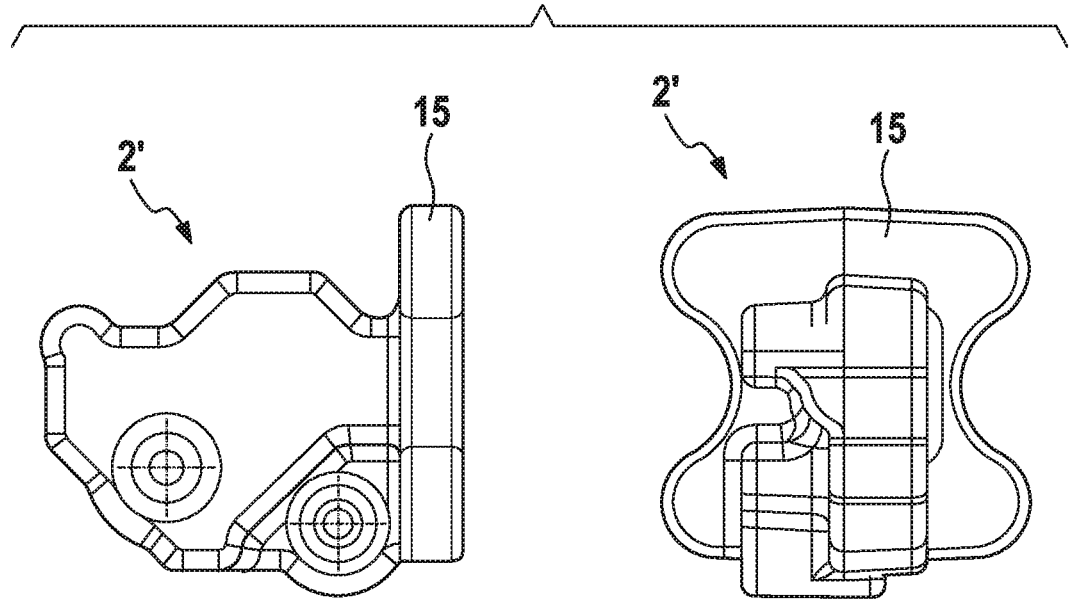
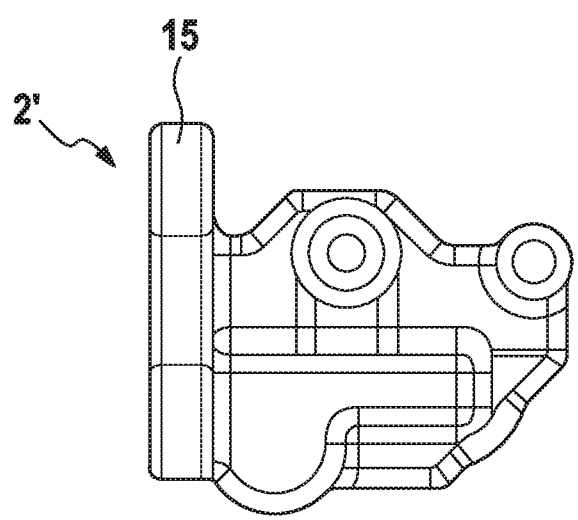

Fig. 5 a)
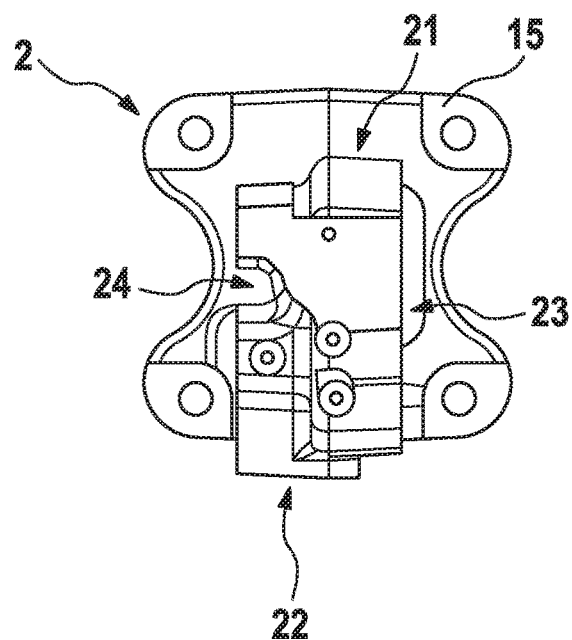
b)
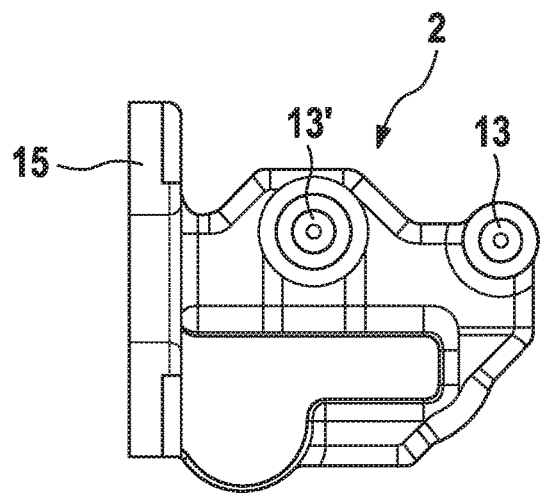
Fig. 6 a)
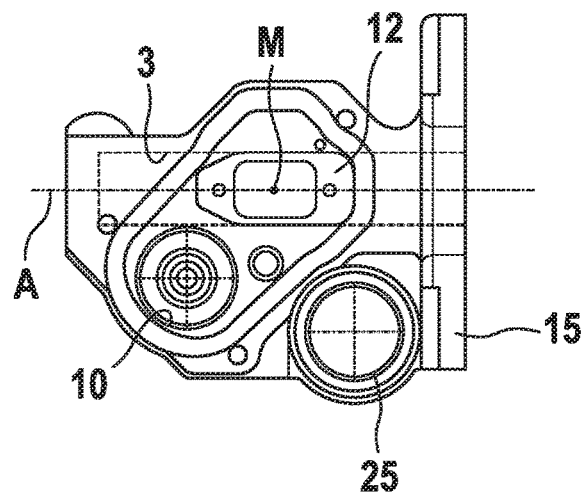
b)
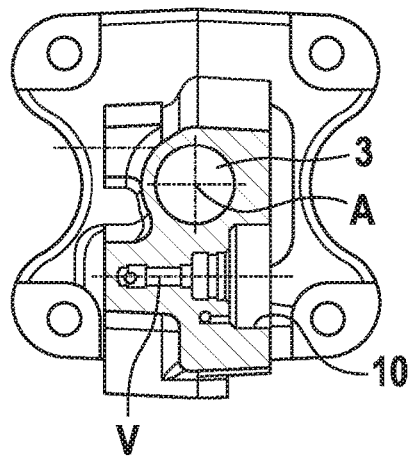

US 12,515,632 B2

COMPACT BRAKING DEVICE FOR A HYDRAULIC MOTOR VEHICLE BRAKING SYSTEM

CROSS-REFERENCE TO RELATED APPLICATIONS

The present application is a National Stage Application under 35 U.S.C. § 371 of International Patent Application No. PCT/DE2021/200048 filed on Apr. 19, 2021, and claims priority from German Patent Application No. 10 2020 205 358.8 filed on Apr. 28, 2020, in the German Patent and Trademark Office, the disclosures of which are herein incorporated by reference in their entireties

TECHNICAL FIELD

The invention relates to a braking device for a hydraulic motor vehicle braking system.

BACKGROUND

Hydraulic braking systems in motor vehicles are common. In order to generate braking pressure, a hydraulic pressure medium, usually a brake fluid, is displaced out of a hydraulic chamber in the direction of the wheel brake by means of a piston. Owing to increasing automation of the vehicle control system, including the braking control system, externally activatable braking systems with electrohydraulic, electromechanical and similar booster stages are becoming increasingly widely used.

In order to be able to optimally use the tight space conditions in the engine compartment, it is known to functionally split a braking system into two individual, spatially separate braking devices which are connected to one another via hydraulic lines. Firstly, there is what is known as a driver request detection unit, which detects the actuation of the brake pedal, generates haptic feedback and, in a fallback level, generates braking pressure directly, at least for emergency braking, using the driver's muscle power. Secondly, there is an actuator unit which provides and regulates the braking pressure by means of a pump and various valve assemblies during regular braking operation.

Since it is actuated directly by the driver, a driver request detection unit has necessarily to be mounted on the bulkhead of the vehicle, whereas the actuator unit can be installed at any other location in the engine compartment.

In particular for the bulkhead-mounted driver request detection unit, it is constantly desired to make the latter as compact as possible in order to take up as little mounting space as possible and at the same time to simplify self-assembly and installation of the required hydraulic and electrical connections.

SUMMARY

According to the combination of features, a compact structural unit is created, in particular with a reduced overall length and overall height. After the braking device has been installed on the bulkhead in the engine compartment of a vehicle, all the interfaces for the hydraulic and electrical connections that have yet to be installed are also accessible from a single side.

BRIEF DESCRIPTION OF THE DRAWINGS

Further features and advantages of the invention will become apparent from the following description. In the appended drawings:

FIG. 2 shows an exemplary embodiment of the braking device in a three-dimensional view a) and a front view b).

FIG. 3 shows the exemplary embodiment according to FIG. 2 in a side view with control and simulator units which are mounted in a) and dismounted in b).

FIG. 4 shows a forged blank for the housing of the braking device according to FIGS. 2 & 3 in front and side views.

FIG. 5 shows the machined housing of the braking device after the metal removal, in a front view and a side view.

FIG. 6 shows the machined housing of the braking device in a different side view and a sectional view through the valve axis of the simulator valve.

DETAILED DESCRIPTION

Figure 1:
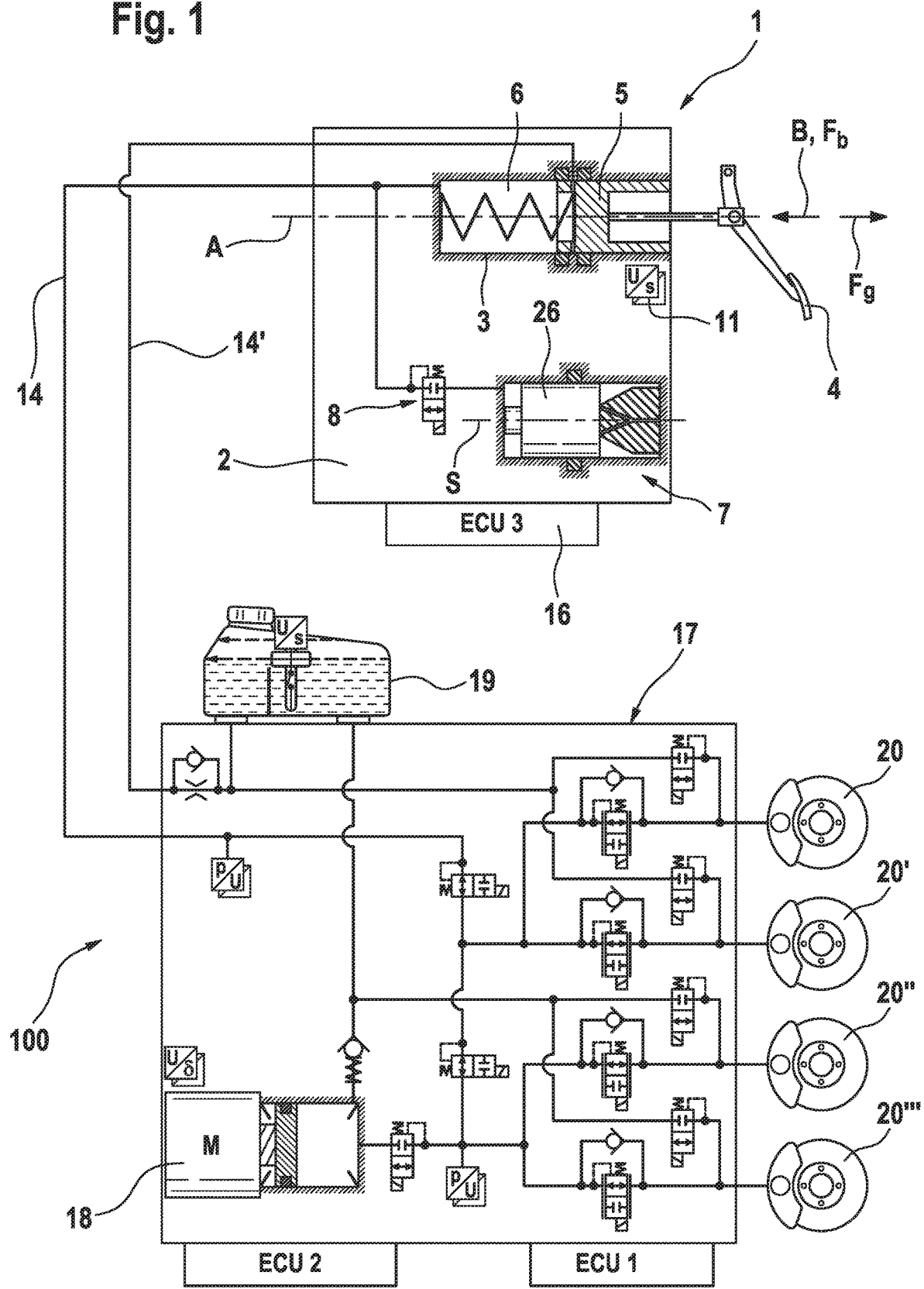
FIG. 1 shows a simplified schematic diagram of a hydraulic braking system comprising a braking device.

FIG. 1 shows a highly simplified hydraulic motor vehicle braking system 100 with a braking device 1. The braking system 100 is constructed with two units which are arranged spatially separated from each another and are connected to each another via brake lines 14, 14'. In addition to the braking device 1, which functions as what is known as a driver request detection unit and is actuated directly by a driver, the braking system 100 comprises what is known as an actuator unit 17, which is driven by an electric pump 18 to generate braking pressure.

A master brake cylinder is arranged in the braking device 1. For this purpose, a cylinder bore 3 which is in the form of a blind hole and has a bore axis A is provided in the housing 2 of the braking device 1. A piston 5 which is actuated by the driver's muscle power via a pedal 4 is mounted in the cylinder bore 3. The piston 5 is axially displaced with an actuating force Fb along the bore axis A in the actuating direction B with compression of a restoring spring braced between the piston 5 and the bottom of the cylinder bore 3. The piston 5 delimits a pressure chamber 6 filled with a hydraulic pressure medium in the cylinder bore 3.

In a regular braking operation, the pressure chamber 6 is connected hydraulically to a simulator unit 7. In the embodiment shown, the simulator unit 7 has a separate simulator piston 26, which is displaceable along a simulator axis S, and an elastic element. A normally closed simulator valve 8 serves to open and disconnect the hydraulic connection between the pressure chamber 6 and the simulator unit 7 and is in turn controlled by an electronic control unit 16. When the piston 5 is actuated in the regular braking operation, the pressure medium is displaced from the pressure chamber 6 into the simulator unit 7, which generates haptic feedback in the form of a progressive counterforce Fg on the pedal 4.

In the event of an irregular braking operation or in what is known as a fallback level, which can occur, for example, in the event of a fault in the electrical supply, the simulator valve 8 is closed and the pressure chamber 6 is instead hydraulically connected directly to one or more wheel brakes 20, 20'; 20", 20''', and therefore the braking pressure is generated directly by the driver by means of the piston 5.

In the schematic diagram shown, the master brake cylinder is shown as a single-piston cylinder. However, the invention also extends to other designs, for example tandem master cylinders.

The actuator unit 17 has a dedicated housing, an electric-motor-driven pump 18, a pressure medium container 19, and one or more valve assemblies. In a regular braking operation, the actuator unit 17 generates the necessary braking pressure and modulates same, for example for various stability adjustments and the like.

FIG. 2 shows an embodiment of the braking device 1 in a three-dimensional view and in a front view. In the mounted position in the vehicle, the housing 2 has an upwardly directed upper side 21, a downwardly directed lower side 22 and two opposite side flanks 23 and 24.

On the actuation side, the housing 2 has a fastening flange 15 which is integrated in one piece therewith and is provided for fastening the braking device 1 to the vehicle.

The electronic control unit 16 and the simulator unit 7 are arranged on a left side flank 23, as viewed in the direction of travel. On the opposite, right side flank 24, as seen in the direction of travel, the housing 2 has 2 hydraulic connections 13, 13', which are provided for connecting the hydraulic lines 14, 14'. The axes of the two connections 13, 13' are oriented parallel to the installation direction of the electronic control unit 16 and the simulator unit 7.

The electrical interface 27 of the control unit 16 is oriented in the same direction as the two hydraulic connections 13 and 13'. In the mounted state, this results in the same plug-in direction from the same side of the housing 2 both for the connection of a corresponding plug connector, not shown here, for the control unit 16 and for the hydraulic lines 14, 14'. A possible free space for installation on the opposite side of the housing 2 can thus be omitted and the distance to adjacent components or assemblies can be reduced.

In FIG. 3, the braking device 1 is shown in a side view with the electric control unit 16 and the simulator unit 7 installed and removed.

A simulator interface 25 in the form of a correspondingly profiled bore, which extends along the simulator axis S, is formed in the housing 2 to accommodate a simulator unit 7 that is constructed substantially rotationally symmetrically. In order to make the housing 2 as compact and as weight-saving as possible, the simulator axis S is oriented perpendicularly to the side flank 23 and transversely with respect to the bore axis A, and the simulator interface 25 or the simulator unit 7 is positioned directly below the cylinder bore 3, which is merely indicated here.

The braking device 1 has a separate sensor device 11 which, depending on the type of embodiment, is provided for detecting one or more static positions or for a continuous detection of the position of the piston 5. The sensor device 11 extends substantially along the bore axis A. The sensor device 11 has an electrical sensor interface 12 for the electrical connection to the control unit 16. Said sensor interface has a plurality of contact points, six in the embodiment shown, which are arranged around a center point M of the sensor interface 12. The sensor interface 12 is also positioned on the side flank 23, at the level of the bore axis A The simulator valve 8 is also located on the same side flank 23 of the housing 2 at which the control unit 16, the simulator unit 7 and the sensor device 11 are arranged. Said simulator valve expediently also has the same installation direction and extends along a valve axis V, which is oriented axially parallel to the simulator axis 6. The simulator valve 8 is usually designed to be electromagnetic, and therefore has a solid annular switching coil 9 and is inserted into a valve interface 10 formed in the housing 2. The valve interface 10 is designed substantially analogously to the simulator interface 25 as a suitably profiled bore in the housing 2. Said valve interface is designed to be at a depth such that the simulator valve 8, including the switching coil 9, is completely recessed in the housing 2.

The valve interface 10, like the simulator interface 25, is located directly below the cylinder bore 3 to save space, but is offset relative to the simulator interface 25 in the actuation direction B beyond the position of the sensor interface 12 such that the center point M of the sensor interface 12 is located above and in the actuation direction B between the simulator axis S and the valve axis V. As a result, the housing 2 can have very short dimensions in the actuation direction.

Reference is made in this connection to FIG. 6 for an exemplary embodiment of the valve interface 10.

A blank 2' for the housing 2 is shown in 3 views in FIG. 4. The blank 2' may be produced by forging. By means of the forging, a homogeneous high-strength structure is achieved, for example in comparison to the casting methods conventionally used for such constructions. As a result, inter alia, wall thicknesses and distances between individual bores can be kept small without functional and safety disadvantages. The fastening flange 15 for installing the braking device 1 on the vehicle can be effectively formed in one piece with the housing during the forging, thus reducing the amount of reworking.

The connections and interfaces are substantially concentrated on two opposite functional sides in the blank 2'. This reduces the amount of subsequent machining. One side is used for outgoing hydraulic connections 13, 13', the other side for the simulator interface 25, the valve interface 10, the sensor interface 12 and the supporting or fastening surface for the control unit 16. The required protrusions and depressions are preformed to reduce the metal removal volume.

In FIG. 5, the housing 2 is shown after the blank 2' according to FIG. 4 has been machined.

The interfaces for the hydraulic connections 13, 13' are arranged on a side flank 24 of the housing 2 opposite the interface for the control unit 16. In addition, said interfaces are preferably oriented axially parallel to the valve interface 10 and the simulator interface 25. In order to machine the two side flanks 23, 24, the blank 2' merely has to be rotated by 180°.

FIG. 6 shows the machined housing 2 of the braking device 1 according to FIG. 5 in a different side view and a sectional view through the valve axis V of the simulator valve 8.

The side view a) of the left side of the housing illustrates the design of the braking device 1. The pattern and the spatial arrangement of the interfaces 10, 25, 12 with respect to one another enable the control unit 16 to be mounted at an angle of approximately 45° to the bore axis A (also see FIG. 3). As a result, the elongate housing of the control unit 16 does not protrude particularly far forward, nor upward or downward. The simulator interface 25 efficiently fills the construction space between the outer contour of the control unit 16 and the fastening flange 15. In addition, owing to the transverse mounting of the simulator unit 7 immediately adjacent below the cylinder bore 3, the overall height of the braking device 1 is also reduced.

The valve interface 10 for accommodating the simulator valve 8, not shown here, is designed to be substantially rotationally symmetrical about the valve axis V. The valve axis V is also positioned below the bore axis A, axially parallel to the simulator axis S.

The valve interface 10 is recessed within the housing 2 in such a way that the simulator valve 8 together with the corresponding switching coil 9 is accommodated at least to a significant extent and may be completely within the housing 2 below the contact plane or supporting surface for the control unit 16.

As a result, the overall height of the control unit 16 can be reduced, for example in comparison to a standard solution in which part of the valve and the switching coil would be accommodated at least substantially within the housing of the order unit 16.

Furthermore, the valve interface 10 is arranged directly adjacent to the sensor interface 12 of the sensor device 11, as a result of which the control unit 16 can also be made more compact.

The invention claimed is:

1. A braking device for a hydraulic motor vehicle braking system comprising:
    a housing with an upper side, a lower side, at least one side flank and, a cylinder bore formed therein along a bore axis;
    at least one piston which is actuable axially in the cylinder bore by a pedal in an actuating direction with an actuating force, wherein the piston in the cylinder bore delimits at least one pressure chamber that can be filled with a hydraulic pressure medium;
    at least one simulator unit for generating a counterforce acting counter to the actuating force, wherein the simulator unit is extends along a simulator axis; and
    wherein the simulator unit is arranged directly below the cylinder bore and the simulator axis is oriented perpendicularly to the at least one side flank and transversely with respect to the bore axis;
    a sensor device least one position of the piston, and
    an electric sensor interface, wherein the sensor interface comprises a plurality of contact points arranged round a center point and is positioned on the at least one side flank of the housing such that the center point is above and in an actuation direction between the simulator axis and the valve axis.

2. The braking device as claimed in claim 1, wherein the pressure chamber is hydraulically connected to the simulator unit in a first operating state and to at least one wheel brake in a second operating state, and further comprising a simulator valve for opening and disconnecting the hydraulic connection between the pressure chamber and the simulator unit, and an electronic control unit which controls at least the simulator valve and is arranged on the housing.

3. The braking device as claimed in claim 2, further comprising:
    a switching coil which electromagnetically switches the simulator valve; and
    a valve interface for accommodating the simulator valve, wherein the valve interface is recessed within the housing such that the switching coil is at least partially within the housing.

4. The braking device as claimed in claim 3, wherein the simulator valve is accommodated completely within the housing.

5. The braking device as claimed in claim 3, wherein the valve interface extends along a valve axis which is axially parallel to the simulator axis and below the bore axis.

6. The braking device as claimed in claim 2, wherein the control unit, the simulator unit and the simulator valve are arranged on the same at least one side flank of the housing and have a same installation direction.

7. The braking device of claim 1, further comprising at least one connection on the housing for a hydraulic line, wherein the connection is arranged on the at least one side flank of the housing opposite the at least one side flank as the control unit and is oriented parallel to the simulator axis.

8. The braking device as claimed in claim 1, further comprising a fastening flange, integrally formed with the housing for fastening the braking device to the vehicle.

9. The braking device as claimed in claim 1, wherein the housing is produced from a forged blank.

10. The braking device as claimed in claim 1, wherein the simulator unit is rotationally symmetric about the simulator axis.

11. The braking device as claimed in claim 3, wherein the switching coil is completely in the recess of the housing.

12. The braking device as claimed in claim 7, wherein the at least one connection is axially parallel to the simulator axis.

13. A braking system for a hydraulic motor vehicle braking system comprising:
    a braking device having a housing with an upper side, a lower side, at least one side flank and, a cylinder bore formed therein along a bore axis;
    at least one piston which is axially actuable in the cylinder bore in an actuating direction with an actuating force via a pedal, wherein the piston in the cylinder bore delimits at least one pressure chamber at least partially delimited by the piston in the cylinder bore, wherein the at least one pressure chamber fillable with a hydraulic pressure medium;
    at least one simulator unit for generating a counterforce acting counter to the actuating force, wherein the simulator unit extends along a simulator axis;
    wherein the simulator unit is arranged directly below the cylinder bore and the simulator axis is oriented perpendicularly to the at least one side flank and transversely with respect to the bore axis,
    a separate actuator unit which comprises at least one electrically driven pump for generating braking pressure in a regular braking operation;
    at least one pressure medium container, wherein the actuator unit is arranged at a spatial distance from the braking device and is connected thereto via hydraulic lines;
    a sensor device for detecting at least one position of the piston; and
    an electric sensor interface, wherein the sensor interface comprises a plurality of contact points arranged around a center point and is positioned on the at least one side flank of the housing such that the center point is above and in an actuation direction between the simulator axis and the valve axis.

* * * * *